United States Patent Office.

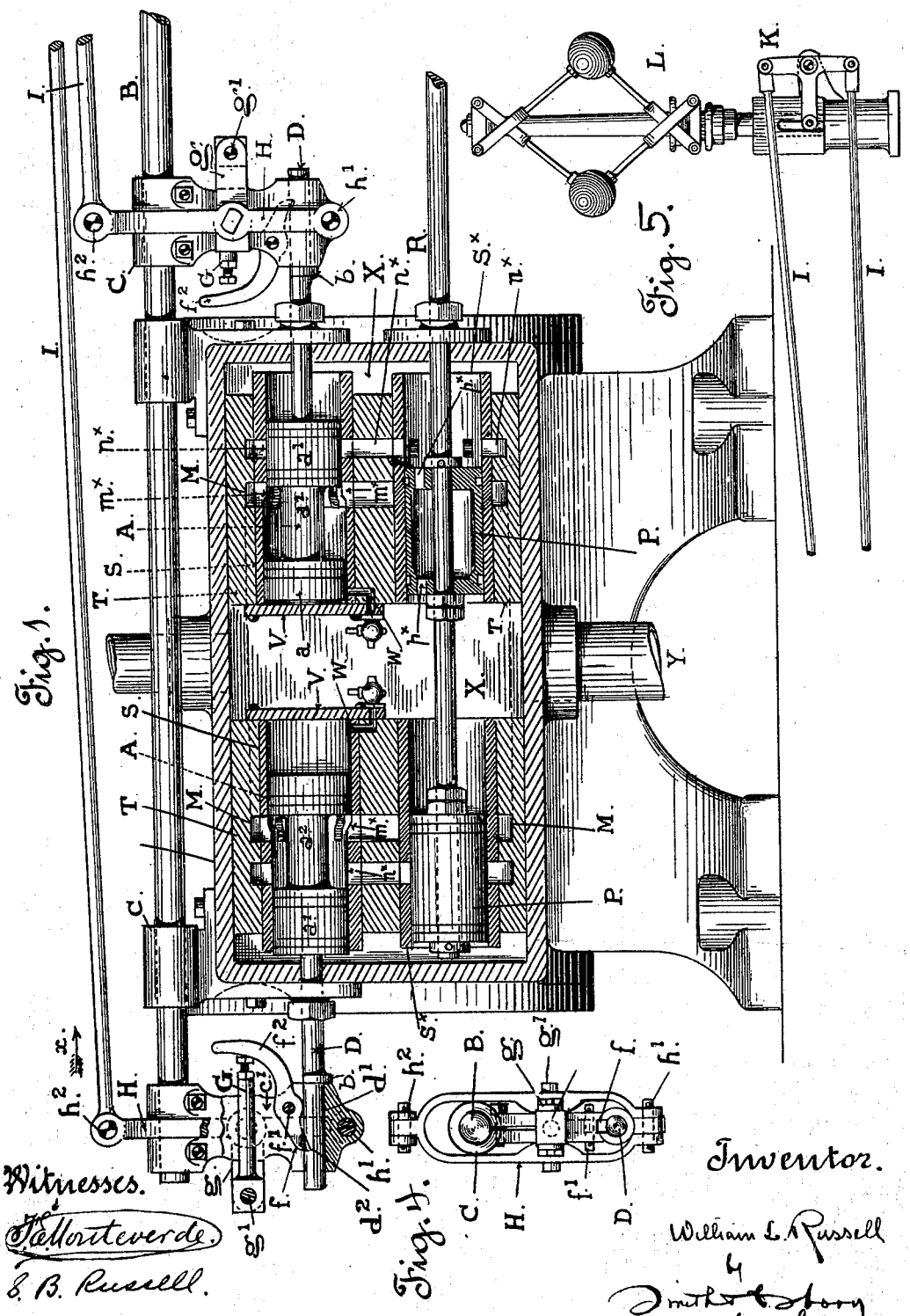

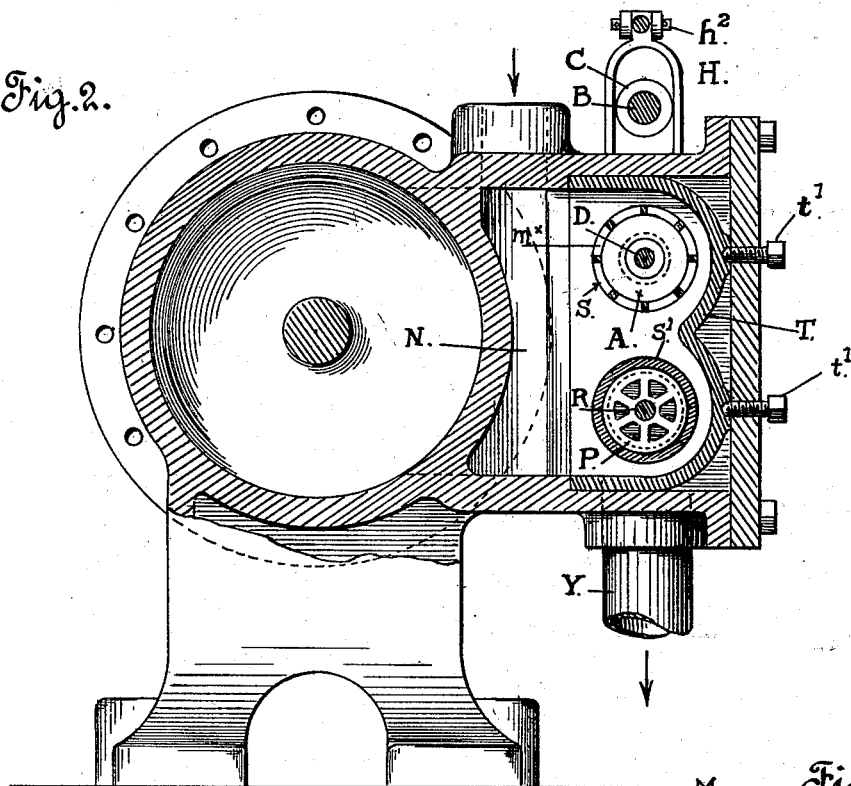
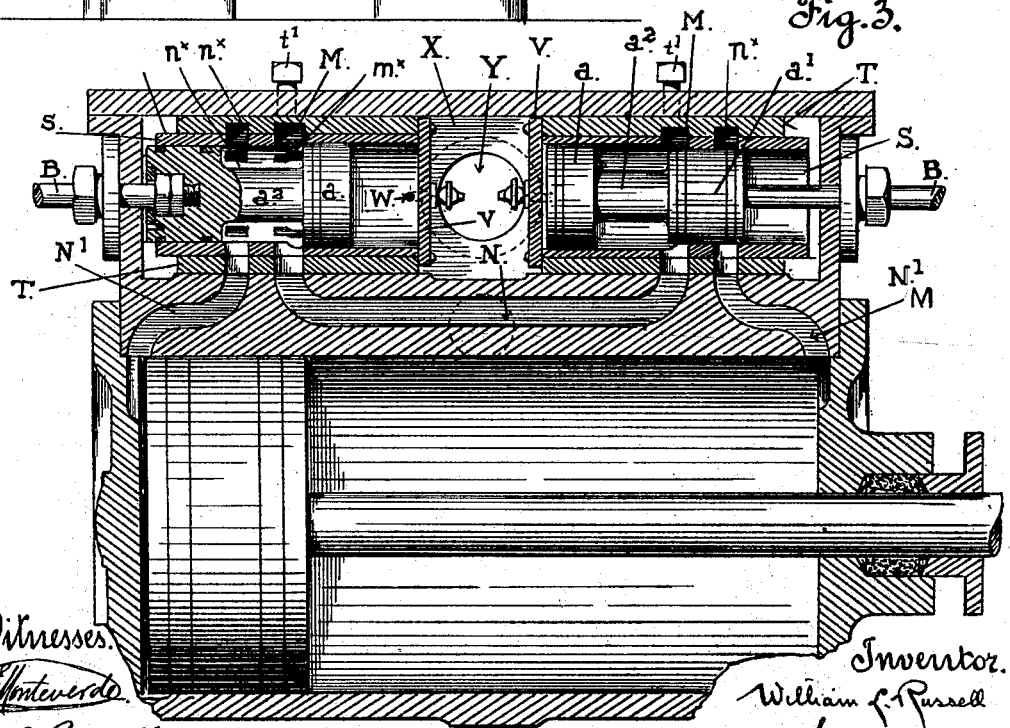

WILLIAM L. RUSSELL, OF OAKLAND, CALIFORNIA.

CUT-OFF-VALVE GEAR.

SPECIFICATION forming part of Letters Patent No. 647,032, dated April 10, 1900.

Application filed May 4, 1899. Serial No. 715,586. (No model.)

*To all whom it may concern:*

Be it known that I, WILLIAM L. RUSSELL, a citizen of the United States of America, residing in the city of Oakland, in the county of Alameda and State of California, have invented new and useful Improvements in Cut-Off-Valve Gear for Steam-Engines, of which the following is a specification.

This invention relates to improvements made in cut-off-valve gear for steam-engines; and it consists in certain novel parts and combination of parts producing a variable cut-off mechanism for operating a piston-valve in which the forward throw or opening movement of the valve is produced by mechanical means and the return throw or movement to cut off the steam is effected by steam-pressure acting directly on the valve, at which time the valve is temporarily detached or released from the actuating-gear.

The improvements include also adjustable releasing mechanism of novel construction connecting the valve with its actuating-rod in a rigid manner for the forward throw and operating to automatically release or disconnect the valve from said mechanism for independent movement under the pressure of the live steam.

The improvements include also novel construction and combination of piston-valves and valve-casing that render these improvements applicable to the valve-chests of many constructions of engines already in use.

The following description explains at length the nature of the said improvement and the manner in which I have constructed, produced, and applied the same for operation, reference being had to the accompanying drawings, forming part thereof.

Figure 1 is a view, principally in longitudinal section, of the valve-chest of a steam-engine, showing my new construction of valves and releasing-gear as arranged for operation with separate valves controlling the exhaust. Fig. 2 is a vertical transverse section through the engine-cylinder and valve-chest, the section being taken through the live-steam port. Fig. 3 is a longitudinal section taken horizontally through the engine-cylinder and admission-valve chambers. Fig. 4 is an end view of the head and yoke of the releasing-gear. Fig. 5 is a detail showing the connecting means between the governor and the releasing-gear.

The object sought to be attained by this invention is mainly to produce a simple and delicately-acting variable cut-off gear for steam-engines and incidentally to operate reciprocating valves of the piston variety, or that are known as "spool-valves," in connection with a variable cut-off-valve gear. Valves of this description are composed of two cylindrical heads $a$ $a'$, fitting the cylindrical valve-chamber, and a stem or central portion $a^2$ of relatively-smaller diameter uniting the two heads, and in a double-acting piston-engine requiring two of these valves they are arranged in the valve-chest in position to control the induction and eduction ports at the opposite ends of the engine-cylinder, and where the exhaust at each end is controlled by a separately-operated exhaust-valve the chamber or compartment for that valve is arranged beneath or alongside of the chamber containing the cut-off valve. In such arrangement as I have shown in Figs. 1 and 3 of the drawings each cut-off valve A has a separate actuating and releasing gear consisting of an eccentric-rod B, operated in the usual manner from the engine-shaft by an eccentric, a block or head C, secured in the eccentric-rod, and a valve-rod D, working through the end of the valve-chest and detachably connected with the head before mentioned, the end of the valve-rod outside the chest being fitted to a socket $d'$ in that head and locked or secured therein by a pivoted latch $f$, having a nose or pointed end to engage a notch $d^2$ in the valve-rod. A tripping device carried or connected with the same head engages the pivoted latch at a point of time sooner or later in the forward throw of the cut-off valve and by disengaging the latch $f$ from the rod detaches the valve from the operating mechanism in that movement, and thereby places the cut-off valve directly under the influence of the steam-pressure in its chamber, by virtue of which the valve is returned quickly to position, covering the steam-ports.

In Figs. 1, 4, and 5, showing the releasing device for both valves, the part C, herein termed the "head," is fixed on the eccentric-rod, and the valve-rod is held fast in the socket by a pivoted latch set in a recess in the head and engaging the notch $d^2$ in the top side of the valve-rod. The body of the latch beyond the pivotal point $f'$ extends outside the head in an upwardly-curved toe $f^2$, standing perpendicularly in front of an opening $c'$ through the middle of the head, in which is supported a tappet-pin G in horizontal position and in line with the toe of the latch, so as to throw up the latch and release the valve-rod by contact with the curved toe in the forward throw of the head. The tappet-pin is supported in the opening before mentioned, so as to move independently of the head to a limited extent, but in the same general direction in which the head is moved, by means of the oscillating yoke H, directly attached at the lower part to the bottom of the head by a loose joint $h'$, but at the upper end is suspended from a movable center or point of oscillation $h^2$ independently of the head. From the side bars of this oscillating piece, which has a suitable width of opening between the sides for the head to clear them, the tappet-pin is supported by a rigid bail formed of the horizontally-extending side bars $g$, between the ends of which the head of the tappet-piece is secured by a bolt $g'$, so as to stand clear of the opening in the head.
By virtue of this construction the tappet-pin while following the movements of the head will have a limited movement independently of the head and of the latch-piece pivoted therein that under different positions assumed by the center of oscillation $h^2$ will cause the point of the tappet-pin to strike the toe-piece and trip the latch at a point earlier or later in the forward throw of the eccentric-rod. Thus by shifting the center of oscillation in the direction of the return throw of the valve, as indicated by the arrow $x$ in Fig. 1, the tappet-pin will be set back to meet and strike the latch earlier in the forward stroke of the eccentric-rod, and the valve-rod will be detached from the head at a point of time in the forward throw of the valve sooner than if the center of oscillation of the yoke were moved in the contrary direction. By connecting this center of oscillation with the engine-governor the moment of tripping the latch and releasing the valve-rod is brought under the control of the engine-governor, whereby it is shifted in one direction or the other to accelerate or to retard by the variations in the working of the engine the moment of cutting off the steam. For this purpose the power of oscillation $h^2$ is connected by a rod I with the rocker-arm K of the engine-governor L, as shown in Fig. 5. As often as it is detached from its actuating mechanism in this manner the valve is entirely under the influence of the steam-pressure, and by virtue of the difference in diameter of one head or end over the other, as seen in Figs. 1 and 3, the valve is returned by the excess of pressure against the head $a$, cutting off the admission of steam through the induction-apertures $m^\times$ and opening the eduction-passages $n^\times$, leading through the valve-chamber from the engine-cylinder to the exhaust-chamber. In the present construction these eduction-passages communicate directly with the exhaust-valve chambers directly beneath the admission-valve through the circumferential grooves $n^\times$.

The exhaust-valves P are hollow cylindrical piston-valves with the exhaust-passages $p^\times$ extending longitudinally through them and opening into the exhaust-space X in the steam-chest, and the two valves are fixed on and actuated by a common rod R.

The plan of construction and arrangement of the two sets of valves and the induction and eduction ports and passages, as illustrated in Figs. 1, 2, and 3, is designed to render these improvements readily applicable to the valve-chests of any reciprocating steam-engine already in use and to afford besides facilities for repairing or replacing the parts most subject to wear.

For each admission-valve and its accompanying exhaust-valve a separate casing T is provided, fitting closely into the valve-chest and fixed therein by lag-screws $t'$, taking through the cover of the chest. These casings and the connected parts are of similar construction and arrangement and the description of one will apply to the other. The casing T is a single casting having two cylindrical bores or openings open at the end, one of which forms the chamber for the admission-valve and the other that for the exhaust-valve. A groove or recess M in the circumference registering with and opening into the steam-passage N in the wall of the engine-cylinder communicates with the interior of the chamber through a circle of apertures $m^\times$, extending around the circumference, and a similar groove $n$ with apertures registers with the eduction-passages $N^\times$ from the cylinder. The last-mentioned set of apertures communicate with the exhaust-valve chamber P' through a groove and apertures $n^\times$ in the walls of that chamber, as seen in Figs. 1 and 2. The wearing-faces of both chambers are formed of separate removable linings S S', having openings in the circumference to register with the ports or apertures in the walls of the chambers and fitting tightly in the bores of the casing. The inner end of the casing T of the admission-valve is closed by a plate V for the purpose of confining a sufficient body of steam in that end of its chamber to form a cushion in front of the valve during the return throw, thereby causing the valve to seat quietly without jar at the end of its throw. An aperture W, connecting this space with the surrounding exhaust-space on the valve-chest, serves as an outlet for the water of condensation and admits steam behind the head for cushioning the valve. This aperture is located in the side of the chamber at a short distance from the head or closed end, so as to be covered by the head of the valve as the same reaches the end of the throw, and thereby cause a portion of the steam to be confined between the head of the valve and the end of the valve-chamber to produce a cushion for the valve at the end of its throw. At the opposite end of the valve-chamber the lining extends beyond the casing a sufficient amount to cover the packing-rings on the valve when that part reaches the end of its forward throw. This end of the valve-chamber is usually left open to the exhaust-space, the entire space surrounding the valve-casings within the valve-chest being open to the exhaust-outlet Y at the bottom of the chest. The arrangement of these passages with relation to the induction ports and passages connecting the engine-cylinder with the valve-chambers is clearly shown in Fig. 1, where the cylinder ports and passages are indicated by dotted lines, and in Fig. 3, where the section is taken directly through these passages.

The return of the valve under the live-steam pressure is effected by making the head $a$ of the valve of greater diameter than the body $a'$ or that part which covers the ports, so as to maintain an excess of pressure against the back of the head sufficiently to throw the valve as soon as the valve-rod is released from the actuating mechanism. The rear portion of the valve-chamber in which the head $a$ works is enlarged in diameter over the remaining portion, inclosing the valve proper, so as to accommodate the larger head of the valve, and into this half of the valve-chamber the live-steam passage is in full communication through the openings $m^\times$ as well when the valve has reached the end of its return throw as when it has completed its forward throw, so that the valve is at all times under the continuous pressure of the live steam.

In the operation of the parts as thus constructed the locking device is thrown off and the valve detached from the actuating mechanism some time in the forward throw of the valve, and the moment of such release is determined by the location of the point of oscillation of the releasing device with respect to its point of attachment to the reciprocating head, so that the release of the valve is caused to take place earlier or later by simply shifting that center of movement in one direction or the other. In the return stroke of the actuating mechanism following the throw of the valve by the steam-pressure the reciprocating head picks up the valve-rod again and the valve is connected for the next stroke. A fixed collar $b$ on the rod limits the backward movement of the head on the valve-rod and also insures a full stroke of the valve being made in the return before the releasing-gear takes the valve for the next throw.

Having thus fully described my invention, what I claim therein as new, and desire to secure by Letters Patent, is—

1. In a valve-gear for steam-engines the combination, with a valve-chamber having portions of two different diameters, a piston-valve having portions of correspondingly-different diameters, ports connecting the portion of larger diameter continuously with the live-steam induction-passages, said valve being adapted thereby to be thrown in one direction by the steam-pressure to cut off the steam from the engine-cylinder; of valve-actuating mechanism for moving the valve in the opposite direction, means detachably connecting the valve with the actuating mechanism, and means controlled by the engine-governor for detaching the valve from said actuating mechanism in the forward throw of the valve.

2. In a valve-gear for steam-engines, a valve-chamber having portions of different diameters, the end of the portion of larger diameter being closed to confine a body of steam between the head of the valve and the end of the chamber, a piston-valve having heads of correspondingly-different diameters to work in said chamber, ports connecting the valve-chamber with the live-steam supply and adapted by their position to maintain constant pressure against the larger head, and actuating mechanism detachably connected to the valve for moving it in the direction opposed to the steam-pressure, and for releasing the valve during that movement.

3. In a valve-gear for steam-engines, a valve-chamber having portions of two different diameters the end of the portion of larger diameter being closed, a piston-valve having heads of correspondingly-different diameters to work in said chamber, ports connecting the valve-chamber with the live-steam supply and adapted by their position to maintain constant pressure against the larger head, a relief-aperture in that portion of the larger chamber behind the valve-space, and actuating mechanism detachably connected to the valve for moving it in the direction opposed to the steam-pressure, and for releasing the valve during that movement.

4. The combination, with the valve-chamber having portions of two different diameters, the end of the portion of larger diameter being closed; of a piston-valve having heads of correspondingly-different diameters to work therein, apertures in said chamber communicating with the live-steam supply upon one side of the larger head of the valve, a relief-aperture in the chamber on the opposite side of the same head, said relief-aperture being located as described to be covered by the valve at the end of its throw; and valve-actuating means detachably connected to the valve for moving the same mechanically in one direction in opposition to the steam-pressure and for releasing the valve during its throw in that direction.

5. The combination, with an engine-valve, of actuating mechanism comprising a reciprocating rod operated from a moving part of the engine, the head on said rod having a socket for the rod of the valve, a latch engaging and locking said rod in the head, an oscillating yoke attached at one end to the head and at the other end to a point of oscillation, and a tripping device carried by said yoke and adapted to trip the latch in the forward throw of the head.

6. The combination with a reciprocating valve continuously under pressure of the controlled steam to be moved thereby in one direction; of mechanism for mechanically producing movement of the valve in the contrary direction, and means detachably connecting the valve with said mechanism, comprising the head, the oscillating yoke attached to the head and to a point of oscillation above the head, a valve-rod, a locking device on said head to secure the valve-rod thereto, and a tripping device carried by said yoke and adapted to engage and throw off the locking device in the movement of the head.

7. In combination with a reciprocating valve continuously under pressure of the controlled steam to be moved thereby in one direction, actuating means mechanically producing movement of the valve in the contrary direction, means detachably connecting the valve with the actuating mechanism comprising a reciprocating part having a locking device, a rod connecting the valve therewith and held by said locking device, an oscillating yoke attached to the reciprocating part and to a point of oscillation above, a tripping device carried by said yoke and adapted to engage and throw off the locking device in the oscillating movement of the yoke, and means controlled by the engine-governor for shifting the center of oscillation, as described.

In testimony that I claim the foregoing I have hereunto set my hand and seal.

WILLIAM L. RUSSELL. [L. S.]

Witnesses:
EDWARD E. OSBORN,
M. REGNER.